3,405,195
IODINATIVE DEHYDROGENATION AND IODINE RECOVERY

Charles E. Sanborn, Walnut Creek, Elmer A. Anderson, El Cerrito, and Herbert H. Engel, Piedmont, Calif., assignors to Shell Oil Company, New York, N.Y., a corporation of Delaware
No Drawing. Filed May 9, 1966, Ser. No. 548,392
6 Claims. (Cl. 260—680)

ABSTRACT OF THE DISCLOSURE

Iodine is recovered from organic iodides produced in iodinative hydrocarbon dehydrogenation by reaction with an aqueous alkali metal or ammonium hydroxide, at a pressure of about 1000 to 3000 p.s.i.g., and a temperature of about 250° to 375° C.

---

This invention relates to a process for the dehydrogenation of organic compounds. More particularly, it relates to a process for the recovery of iodine from the organic iodides produced as by-products in iodative dehydrogenations.

Baijle et al. in U.S. 3,130,241, Apr. 21, 1964, disclose the use of certain metal oxides as hydrogen iodide acceptors in the reaction of iodine with organic compounds. U.S. Patent 3,080,435, issued Mar. 5, 1963, to Nager, discloses a method for the dehydrogenation of organic compounds involving: (1) iodative dehydrogenation of an organic compound by reaction with elemental iodine in a molten metal iodide/metal oxide environment to produce a dehydrogenated compound and hydrogen iodide; (2) immediate reaction of the hydrogen iodide with the corresponding metal oxide or hydroxide to form the corresponding metal iodide; and (3) regenerating elemental iodine from the metal iodide, either in the dehydrogenation zone or in a separate oxidation zone, by reaction with oxygen under conditions under which the metal iodide is in a molten state. Such iodative dehydrogenation processes often have the disadvantage of producing, in addition to hydrogen iodide, various organic iodides which do not react readily with metal oxides. These undesirable iodine-containing compounds not only decrease the efficiency of the dehydrogenation by remaining in the combined form but also contribute to the cost of the process by the resultant loss of iodine in the organic iodides. Moreover, it is important to minimize the amount of iodine to be disposed of in waste solutions and in air, thereby reducing any pollution problems.

It is, therefore, a primary object of this invention to provide an improved process for the recovery of iodine from by-product organic iodides formed during an iodative dehydrogenation process.

Other objects and advantages of this invention will be apparent and better understood from the following detailed description, which illustrates a preferred mode of practicing the invention.

In accordance with the present invention and as a preferred embodiment thereof, it has now been found that the recovery of iodine from organic iodides produced in iodative dehydrogenations can be accomplished, thereby reducing the loss of iodine, by subjecting the organic iodides to reaction in liquid phase with an aqueous alkali metal or ammonium hydroxide under superatmospheric pressure and substantially above the normal boiling point of water. The resulting iodide salt can be returned to the iodative dehydrogenation step for further reaction. The reaction is carried out in the absence of oxidizing agents to avoid the formation of iodates, but it can be carried out in the presence of hydrogen or in the presence of non-acidic inert gases.

This invention is applicable to iodative dehydrogenation of various organic compounds, especially hydrocarbons. However, for the sake of brevity and specificity, the invention will be described in further detail in connection with the production of conjugated alkadienes, particularly butadiene, by the iodative dehydrogenation of more saturated aliphatic hydrocarbons having the same number of carbon atoms, e.g., butane/butene, in the presence of molten LiI/LiOH, with regeneration of iodine from LiI as more fully disclosed in U.S. Patent 3,080,435.

The organic iodides subjected to conversion according to the present invention may be obtained in various stages of product recovery. For example, in the preparation of butadiene by iodative dehydrogenation, the product issuing from the dehydrogenation zone is in the form of a gas. Generally, this product gas is first quenched as rapidly as possible to remove any unreacted iodine or hydrogen iodide not absorbed in the dehydrogenation zone of the reactor. The rapid quenching prevents any subsequent reaction between the unreacted iodine or hydrogen iodide and the product olefins, which would lead to the formation of additional quantities of organic iodides, and averts polymerization or degradation of the organic iodides already present in the product gas to tars and heavy ends. Deterioration of the product olefins arising through dimerization at elevated temperatures is also minimized. Such quenching produces a gaseous and an organic liquid phase, as well as an aqueous phase from the condensation of the by-product water from the dehydrogenation process. The organic gas and liquid streams are then separated from the aqueous stream by usual phase separation techniques. Following this, the desired olefin products, such as butadiene, and the unreacted or partially converted feeds, such as butane and butenes, are removed by distillation from the organic by-products. It is these organic by-products which contain valuable iodine in the form of organic iodides; and it is the recovery of iodine to which the present invention is directed.

In a preferred embodiment of the invention, the conversion zone is charged with an aqueous alkaline solution (3% $NH_3$), and the previously separated organic by-product stream, described above. If desired, hydrogen gas may be added to create a partial pressure of about 100–500 p.s.i.g. The organic and aqueous solutions are thoroughly mixed by suitable means and the temperature raised to 200 to 375° C. to create a total pressure inside the conversion zone of about 1000–3000 p.s.i.g. At the completion of the reaction, usually about 20–180 minutes, the aqueous organic mixture is passed into a phase separator wherein the hydrocarbon phase is separated out and purged from the system. The aqueous phase contains the iodine removed during the reaction in the form of an iodide salt, such as ammonium iodide. The aqueous solution is then drawn into a steam stripper. The use of a stripper is optional and depends upon the alkaline medium used. Steam is introduced into the stripper, and aqueous ammonia is removed from the stripper and purged from the system or may be recycled to the conversion zone. The pH of the solution in the stripper is maintained by the addition of an aqueous solution of alkali metal hydroxide, e.g., LiOH, which serves to convert the hydrogen iodide, released by the stripping off of the ammonia, to alkali metal iodide and water. The aqueous alkali metal iodide solution containing all of the recovered iodine is then withdrawn from the stripper, and may enter an oxidation zone wherein free iodine is generated and used in the iodative dehydrogenation of butane and butenes to butadiene.

In the event that the base in the conversion zone is an alkali metal base such as LiOH instead of ammonia, the iodine in the organic iodides will be converted directly to the alkali metal iodide and therefore need not enter the stripper after phase separation from the phase separator, but may be passed directly to an iodative dehydrogenation zone and used as a source of iodine in the iodative dehydrogenation, e.g., of butanes and butenes to butadiene.

Various alkali metal or ammonia aqueous media may be used within the concept of this invention for carrying out the conversion. It is preferable, however that the medium used be one which will serve to recover the iodine in a readily useable form. It is preferred to recover the iodine from organic iodides in the form of an iodide readily converted to LiI, such as $NH_4I$ or as LiI. The preferred medium is therefore an aqueous solution of LiOH, LiI/LiOH mixtures or $NH_3$.

The molar ratio of base to organic iodide is at least 1:1 and preferably greater. The reaction proceeds more rapidly at higher hydroxide concentrations. The nature of the reactions involved is not known with certainty, but the results indicate that it is not simply hydrolysis; the organic residue is not converted merely to the corresponding alcohols.

Generally, the aqueous alkaline solutions contain from 1 to 30, preferably 2 to 28, percent by weight $NH_3$, or 1 to 6, preferably 2 to 4, percent by weight LiOH; however, higher or lower concentrations may be used within the scope of this invention. The weight ratio of aqueous solution to organic feed (containing organic iodide) in the conversion zone may vary from 0.1:1 to 4:1 and is preferably from 0.5:1 to 2:1.

The total pressure within the conversion zone at the prevailing reaction temperatures ranging between 250° C. and 375° C., preferably about 300–350° C., may vary from 1000 to 3000 p.s.i.g. with pressures between 1400 and 2800 being preferred. If an hydrogenolysis is to be effected, the partial pressure of hydrogen within the hydrogenolysis zone may vary from about 100 to 500 p.s.i.g.

The reaction time may vary somewhat depending upon the temperature, pressure, and ratio of base to organic iodide. Generally, reaction times between 20 and 180 minutes are adequate.

If desired, certain catalysts may be added to the aqueous base solution without departing from the scope of the invention. It is known that certain catalysts such as copper sulfate, copper metal, zinc metal and sodium phosphate often aid in the acceleration of the recovery of organic iodides. Copper and copper-containing salts have been found to be the most helpful.

In order to assure adequate mixing of the aqueous and organic phases in the conversion zone, it is important that the proper degree of agitation or stirring be maintained. In the absence of adequate agitation, particularly when using an aqueous solution of LiI/LiOH, solids are formed which are undesirable. Since the degree of agitation most effective is dependent upon the particular base used as well as on the volume of the liquid in the conversion zone, no precise number can be assigned; however, agitator capacities in the range of 0.5 to 5 HP/1000 gallons have proven satisfactory.

The composition of the organic iodides subjected to conversion may vary from sample to sample and also depends upon the feed being iodatively dehydrogenated. For example, in the dehydrogenation of $C_4$ hydrocarbons, the iodides obtained range from methyl iodide up to and including certain aromatic iodides. The majority of the iodides are $C_4$ compounds. However, vinylic and aromatic iodides are very common in by-product iodide mixtures. These iodides, particularly the aromatic iodides, are especially difficult to convert to the desired alkali metal iodide or ammonium iodide, the conversion proceeding only under very severe conditions. In mixtures in which unsaturated iodides are present, it may be preferred to first hydrogenate the unsaturated iodides by passing a stream of hydrogen through the mixture before attempting to recover the iodides by the process of the invention; or the two steps, hydrogenation and conversion, may be carried out simultaneously.

The following examples are illustrative of the present invention. The organic iodides were recovered from the product gas stream of the iodative dehydrogenation of butane/butene to butadiene. All percentages are expressed as percent by weight.

Example I

A feed stock containing 11.5% organic iodides obtained as a condensate from the gaseous product of the iodative dehydrogenation of butene to butadiene was placed in a reactor along with an aqueous solution containing 3% by weight $NH_3$ in water. The weight ratio of the organic phase to the aqueous phase was 1.89. The temperature of the reactor was raised to 300° C., and the total pressure in the reactor was maintained at about 1700 p.s.i.g. for 180 minutes. During this period, the aqueous organic phases were continuously intermixed by a stirrer operating at 600 r.p.m. The stirring was then terminated and the reactor cooled. Upon phase separation, the organic phase was withdrawn and discarded. The aqueous phase, containing all of the recovered iodine as $NH_4I$, was recovered. Analysis of products of several runs with different ammonia concentrations gave the results summarized in Table I.

TABLE I

| | Base Solution | | | |
|---|---|---|---|---|
| | 3% aq. $NH_3$ | 6% aq. $NH_3$ | | 28% aq. $NH_3$ |
| Equivalents Ratio, OH/I | 1.49 | 2.6 | 1.7 | 18.2 |
| Weight Ratio, Base/Feed | 0.86 | 1.0 | 0.5 | 1.0 |
| Temperature, °C | 315 | 300 | 300 | 265 |
| Pressure, p.s.i.g | 1,500 | 1,700 | 1,700 | 1,600 |
| | Time, min. | | | |
| | 60  120  180 | 180 | 180 | 60  120  180 |
| Percent $I_2$ Recovery | 90  93.5  95 | 96 | 96.5 | 95  97.2  97.8 |

Example II

A feed stock containing 11.5% organic iodides obtained as a condensate from the gaseous product of the iodative dehydrogenation of butane to butadiene was placed in a reactor along with an aqueous solution containing 3% by weight $NH_3$ in water. The weight ratio of the organic phase to the aqueous phase was 1.89. The reactor was charged with a partial pressure of 500 p.s.i.g. hydrogen and the temperature raised to 300° C. The total pressure at this temperature was about 1700 p.s.i.g. and was maintained for 180 minutes. During this period the aqueous-organic phases were continuously intermixed by a stirrer operating at 600 r.p.m. The stirring was then terminated and the reactor cooled. Upon phase separation the organic phase was withdrawn and discarded. The aqueous phase, containing all of the recovered iodine as $NH_4I$, was recovered and upon analysis showed a conversion of organic iodide of 97.6%.

The $NH_4I$ obtained from the reactions of Examples I and II can be recovered as LiI for reuse in iodative dehydrogenation by adding the $NH_4I$ to an aqueous LiI/LiOH solution containing a stoichiometric excess of LiOH, relative to $NH_4I$, at an elevated temperature and steam-stripping the $NH_3$ out of the $NH_4I$ and converting the iodide content thereof to LiI.

Example III

A series of runs similar to those made in Example I were made aqueous LiOH as the basic solution instead of NH₃; the results are summarized in Table II.

TABLE II

| | Aqueous Base Solution | | |
|---|---|---|---|
| | 2% LiOH | 4% LiOH | 2% LiOH |
| Gas, p.s.i.g. $H_2$ | None | None | 300 |
| Equivalents Ratio, OH/I | 1.84 | 3.38 | 1.84 |
| Weight Ratio, Base/Feed | 2 | 2 | 2 |
| Temperature, °C | 300 | 300 | 300 |
| Pressure, p.s.i.g | 1,300 | 1,450 | 1,450 |
| Light Ends Feed, I, percent wt | 11.5 | 12.56 | 11.5 |
| Percent Iodine Recovery at— | | | |
| 20 minutes | 80 | 95 | 93 |
| 60 minutes | 86 | 97.3 | 96.9 |
| 180 minutes | 88.3 | 98.5 | 98.4 |

Example IV

Following the procedure outlined in Example II, the runs listed in Table III were made using an aqueous LiI/LiOH solution as the alkaline medium.

TABLE III

| | Aqueous Base Solution | |
|---|---|---|
| | 2% LiOH 35% LiI | 2% LiOH 35% LiI |
| Gas, p.s.i.g. $H_2$ | None | 500 |
| Equivalents Ratio, OH/I | 1.84 | 1.84 |
| Weight Ratio, Base/Feed | 2 | 2 |
| Temperature, °C | 310 | 310 |
| Pressure, p.s.i.g | 1,150 | 1,500 |
| Light Ends Feed, I, percent wt | 11.50 | 11.50 |
| Percent Iodine Recovery at— | | |
| 20 minutes | 85 | 99.2 |
| 60 minutes | 96.5 | 99.6 |
| 180 minutes | 98.7 | 99.7 |

Example V

The following runs show the feasibility of using a small amount of a catalyst in addition to hydrogen in the hydrogenolysis of organic iodides to recover iodine.

TABLE IV

| | Aqueous Hydrogenolysis Solution | |
|---|---|---|
| | 2% LiOH 1% Cu | 2% LiOH 0.2% CuSO₄ |
| $H_2$ Pressure, p.s.i.g | ~500 | ~500 |
| Equivalents Ratio, OH/I | 1.63 | 1.70 |
| Weight Ratio, OH/Feed | 2 | 2 |
| Temperature, °C | 300 | 295 |
| Pressure, p.s.i.g | 1,600 | 1,600 |
| Light Ends Feed, I, percent wt | 13.17 | 12.48 |
| Time, minutes | 60 | 60 |
| Percent Conversion | 99.8 | 99.7 |

Example VI

Several runs were made to determnie the effect of adding a wash oil to the conversion mixture in a range of temperatures. The results given below in Table V show the conversion with a 6% aqueous ammonia solution of the organic iodides. The organic to aqueous phase ratio for these runs was 2:1 and the rotor speed was 600 r.p.m.

TABLE V

| Wash Oil, Percent | Temperature, °C | Pressure, p.s.i.g. | Organic Iodide Feed, Percent | Time to Reach 99% Conversion, hr. |
|---|---|---|---|---|
| 0 | 320 | 1,825 | 8.89 | 4.9 |
| 0 | 320 | 1,800 | 14.38 | 3.2 |
| 13 | 320 | 1,700 | 12.14 | 4.5 |
| 13 | 320 | 1,600 | 12.20 | 4.6 |
| 22 | 320 | 1,650 | 7.13 | 4.8 |
| 17 | 340 | 2,150 | 9.34 | 1.2 |
| 22 | 340 | 2,100 | 7.13 | 1.0 |
| 22 | 360 | 2,450 | 7.13 | 1.2 |
| 17 | 360 | 2,450 | 9.34 | 1.0 |
| 17 | 380 | 1,800 | ¹ 9.34 | 0.1 |

¹ Organic/aqueous phase ratio=4; 12% aqueous $NH_3$.

We claim as our invention:

1. In a process for the iodative dehydrogenation of a first hydrocarbon to a second hydrocarbon having a higher carbon-to-hydrogen ratio, wherein the first hydrocarbon and iodine are reacted at a temperature in the range of about 400 to 650° C., whereby the second hydrocarbon and a minor amount of organic iodides are formed, and the organic iodides are separated from the second hydrocarbon and processed for the recovery of the iodide content thereof, the improvement comprising subjecting the separated organic iodides to a reaction in liquid phase with an aqueous alkaline solution of an alkali metal hydroxide or ammonium hydroxide at about 1000 to 3000 p.s.i.g. and a temperature in the range of about 250° to 375° C. to convert substantially all of the iodine content thereof to the corresponding water-soluble alkali metal iodide or ammonium iodide.

2. A process in accordance with claim 1 wherein the weight ratio of the aqueous alkaline solution to organic iodide is in the range of 0.1:1 to 4:1.

3. A process in accordance with claim 1 wherein the concentration of the aqueous phase alkaline solution is about 1–30% $NH_3$ or 1–6% alkali metal hydroxide.

4. A process in accordance with claim 3 wherein the concentration of the aqueous alkaline solution is about 3–28% $NH_3$, and the iodide formed is $NH_4I$.

5. A process in accordance with claim 3 wherein the concentration of the aqueous alkaline solution is about 2–4% LiOH, and the iodide formed is LiI.

6. A process in accordance with claim 4 wherein the $NH_4I$ is stripped with steam in an aqueous LiI/LiOH solution, thereby removing $NH_3$ and recovering the iodine as LiI.

References Cited

UNITED STATES PATENTS

| 3,080,435 | 3/1963 | Nager | 260—673.5 |
| 3,200,166 | 8/1965 | Bojanowski | 260—681.5 |
| 3,310,596 | 3/1967 | King | 260—680 |
| 3,205,280 | 9/1965 | Wattimena et al. | 260—680 |

DELBERT E. GANTZ, *Primary Examiner.*

G. E. SCHMITKONS, *Assistant Examiner.*